(12) United States Patent
Fraer et al.

(10) Patent No.: US 7,318,541 B2
(45) Date of Patent: Jan. 15, 2008

(54) STORAGE RACK FOR HUMAN TRANSPORTER

(75) Inventors: Richard W. Fraer, Sterling, VA (US); Bradley J. Suchy, Germantown, MD (US)

(73) Assignee: United States Postal Service, Washington, DC (US)

( * ) Notice: Subject to any disclaimer, the term of this patent is extended or adjusted under 35 U.S.C. 154(b) by 131 days.

(21) Appl. No.: 10/372,605

(22) Filed: Feb. 21, 2003

(65) Prior Publication Data

US 2004/0164114 A1 Aug. 26, 2004

(51) Int. Cl.
*B60R 9/00* (2006.01)

(52) U.S. Cl. .............. 224/518; 224/530; 224/526; 224/504; 414/639

(58) Field of Classification Search ........... 224/518, 224/450, 530, 526, 502, 504, 505; 414/462, 414/639 X, 537; 280/789, 639
See application file for complete search history.

(56) References Cited

U.S. PATENT DOCUMENTS

| | | | | |
|---|---|---|---|---|
| 1,261,681 A | * | 4/1918 | Barnett | 414/537 |
| 3,025,985 A | * | 3/1962 | Wallace | 414/537 |
| 3,051,336 A | * | 8/1962 | Felsten | 414/537 |
| 3,072,275 A | * | 1/1963 | Ralston | 414/462 |
| 3,207,396 A | * | 9/1965 | Mundell et al. | 224/513 |
| 3,561,621 A | * | 2/1971 | Rivers, Jr. | 414/537 |
| 3,567,052 A | * | 3/1971 | Allen et al. | 414/462 |
| 3,757,972 A | * | 9/1973 | Martin | 414/537 |
| 3,834,565 A | | 9/1974 | Goodman et al. | |
| 3,896,946 A | | 7/1975 | Forsyth et al. | |
| 3,921,842 A | * | 11/1975 | Campbell | 414/462 |
| 3,945,521 A | * | 3/1976 | Decker | 414/483 |
| 4,032,167 A | * | 6/1977 | Chereda | 410/3 |
| 4,089,542 A | | 5/1978 | Westerman | |
| 4,189,274 A | * | 2/1980 | Shaffer | 414/462 |
| 4,411,580 A | * | 10/1983 | Kelly | 414/462 |
| 4,413,761 A | * | 11/1983 | Angel | 224/485 |
| 4,514,132 A | * | 4/1985 | Law et al. | 414/537 |
| 4,705,448 A | * | 11/1987 | Mungons | 414/462 |
| 4,749,317 A | * | 6/1988 | Daniel | 410/26 |
| 4,775,282 A | * | 10/1988 | Van Vliet | 414/462 |
| 4,815,638 A | * | 3/1989 | Hutyra | 224/525 |
| 4,932,830 A | * | 6/1990 | Woodburn | 414/495 |
| 5,018,651 A | * | 5/1991 | Hull et al. | 224/502 |
| 5,431,524 A | | 7/1995 | Antal et al. | |
| 5,462,398 A | * | 10/1995 | Hymer | 414/462 |
| 5,553,762 A | * | 9/1996 | Brown | 224/403 |

(Continued)

FOREIGN PATENT DOCUMENTS

GB 2334487 A 8/1999

*Primary Examiner*—Tri M. Mai
(74) *Attorney, Agent, or Firm*—Lewis and Roca LLP

(57) ABSTRACT

There is disclosed a storage rack that can onload, secure, and offload a human transporter device such as a SEGWAY HT. The storage rack is attached to a vehicle such as a postal vehicle. The vehicle can thus transport a human transporter while the human transporter is itself secured to the storage rack. The storage rack includes a ramp. A human transporter can be loaded onto the storage rack under its own power by moving up the ramp, and the human transporter can be offloaded from the storage rack under its own power by moving down the ramp. The ramp is secured to the storage rack in an upright position when the carrying vehicle is in motion.

11 Claims, 7 Drawing Sheets

U.S. PATENT DOCUMENTS

| | | |
|---|---|---|
| 5,971,091 A | 10/1999 | Kamen et al. |
| 6,302,230 B1 | 10/2001 | Kamen et al. |
| 6,357,544 B1 | 3/2002 | Kamen et al. |
| 6,367,817 B1 | 4/2002 | Kamen et al. |
| 6,405,816 B1 | 6/2002 | Kamen et al. |
| 6,415,897 B1 | 7/2002 | Sugimoto et al. |
| 6,443,250 B1 | 9/2002 | Kamen et al. |
| 6,502,730 B2 * | 1/2003 | Johnson ................... 224/519 |
| 6,543,985 B1 * | 4/2003 | Harstad et al. ............ 414/537 |
| 2001/0030216 A1 * | 10/2001 | Johnson ................... 224/519 |

\* cited by examiner

US 7,318,541 B2

STORAGE RACK FOR HUMAN TRANSPORTER

STATEMENT REGARDING FEDERALLY SPONSORED RESEARCH OR DEVELOPMENT

The invention was made by an agency of the United States government or under a contract with an agency of the United States government, the United States Postal Service ("USPS" or "Postal Service"), an independent establishment of the executive branch of the U.S. government.

BACKGROUND OF THE INVENTION

1. Field of the Invention

The present invention relates to storing and carrying a human transporter device. More particularly the present invention relates to a storage rack for carrying a human transporter device where the storage rack is attached to a vehicle. Further the invention relates to a storage rack for a human transporter that allows the human transporter to be easily loaded and unloaded from the storage rack.

2. Description of the Related Art

USPS mail carriers deliver mail to homes and businesses. Some carriers use a vehicle, referred to in the Postal Service as a Carrier Route Vehicle, to transport mail along their designated route. A common practice is for a mail carrier to load presorted mail into a satchel and walk to each address along the route while dropping off mail at those addresses. The mail is sorted in a sequence so that the carrier typically walks from the carrier route vehicle and loops around returning to the vehicle while delivering mail. The mail carrier will reload the satchel and repeat the delivery process until the mail for the area surrounding the vehicle has been delivered. This is referred to as a park and loop route.

New technology has recently been developed which may allow greater efficiency and flexibility with the park and loop delivery system. There has been developed a human transporter that can transport humans in areas typically used for pedestrian traffic. The human transporter also can carry its human passenger over uneven terrain. Such a human transporter is generally described as being a self-balancing scooter. The human transporter is motorized so that its human passenger is carried under the energy of the transporter. Further the human transporter accepts control commands by its human operator so that it can follow curves and changes in direction. One such human transporter now in use by the Postal Service is offered under the commercial name SEGWAY, also called the SEGWAY human transporter. Several U.S. Patents have been issued related to the SEGWAY human transporter. These include: U.S. Pat. Nos. 6,367,817; 6,357,544; 6,302,230; and No. 5,971,091.

The use of such a human transporter provides several advantages over the traditional method of walking a park and loop route. In the first instance a human transporter lessens the degree of fatigue experienced by a mail carrier. Particularly in the latter part of the route, or later in the workday, whereas a mail carrier operating on foot will often experience a slowdown in performance due to fatigue, the human transporter can assist the mail carrier to continue working at a desired speed of delivery. In addition, the human transporter allows the mail carrier to increase his or her carrying capacity, thereby increasing the loop size. Carrying capacity can be improved by saddling the mailpouch or satchel on the human transporter. Such an increase in carrying capacity and loop size will require fewer return trips by the mail carrier to the vehicle. Further, the human transporter allows a mail carrier to make diversions from the loop at a quicker and more efficient pace. Thus the use of a human transporter in the park and loop mail delivery system offers increased efficiency to the Postal Service.

Given the efficiencies to be gained through the use of the SEGWAY human transporter, the U.S. Postal Service is purchasing several such devices. Segway human transporters are now in use by the Postal Service.

A human transporter such as the SEGWAY device will itself be transported by the mail carrier's carrier route vehicle. In this way the human transporter will accompany the mail carrier as he or she makes various stops for deliveries along a given route. However, the carrier route vehicle was not previously designed for the function of carrying the SEGWAY human transporter. Thus it is necessary to modify the carrier route vehicle to enable it to transport a SEGWAY human transporter.

Thus it would be desirable to provide a human transporter storage rack to be attached to a vehicle. It would be further desired that the human transporter storage rack be designed for attachment to the carrier route vehicle to be used by mail carriers of the Postal Service.

A SEGWAY human transporter is itself a heavy device; and it is not easily lifted or carried by a human being. In February 2003, the Segway human transporter was listed as weighing 83 lbs. Thus the storage rack should also provide a means whereby a human transporter can be loaded onto and unloaded from the carrier route vehicle. However, at present no such storage rack system is available.

It would therefore also be desirable to provide a means for loading and unloading a human transporter onto a loading rack. Further it would be desired that a human transporter be loaded onto and unloaded from the storage rack under its own power.

As the loading rack will be affixed to a carrier route vehicle, it would be desired to provide a means to retrofit the carrier route vehicle to easily accept a human transporter storage rack. It would further be advantageous to provide a means for attaching the storage rack to the carrier route vehicle design that is now in use.

A human transporter such as the SEGWAY HT is an expensive piece of machinery. It is expected that a human transporter may present an inviting target for thieves. Thus, it is strongly desired that a storage rack carrying an HT into various public locations, on a daily basis, should have some method or means of locking and securing the HT in place. The locking mechanism and storage rack itself should be strong and robust in order to deter attempts at theft.

When used in the mail service, a single human operator may operate the human transporter and its storage rack system. Thus it would be desired that a storage system be simple in design and operation. Any movement of the storage system pieces or components should be such that a single human could easily operate them.

SUMMARY OF THE INVENTION

The present invention overcomes deficiencies in the prior art by providing a human transporter storage rack. The storage rack attaches to a vehicle and may be transported from place to place by the vehicle. The storage rack includes ramps by which a human transporter may be driven from the ground, up the ramps, and on to a base area of the storage rack. The human transporter may also be unloaded from the storage rack by driving the human transporter down the ramps. The storage rack base includes cut aways that firmly hold the human transporter in place during transport. Further, the storage rack ramps lock into place around the center pole of the human transporter so as to provide an additional means to secure the human transporter to the storage rack.

The storage rack of the present invention is easily fitted to existing carrier route vehicles of the USPS. Additionally the storage rack is easily adapted for attachment to other kinds of vehicles such as delivery trucks and vans.

The storage rack is designed such that a single human operator can lift the ramp module of the storage rack from an open to a closed position. A single human operator can also open the storage rack by moving the ramp module from a closed or locked position to an open position.

The storage rack holds a human transporter securely in place both for transportation and so as to deter theft. The storage rack may be locked in the closed or locked position with either a single or double lock. When locked the storage rack cannot be opened (until unlocked); and therefore the human transporter cargo is secure.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory only and are not restrictive of the invention, as claimed. Thus, the present invention comprises a combination of features, steps, and advantages which enable it to overcome various deficiencies of the prior art. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of a preferred embodiment of the present invention, reference will now be made to the accompanying drawings, which form a part of the specification, and wherein.

DETAILED DESCRIPTION OF THE PREFERRED EMBODIMENT

Reference will now be made in detail to exemplary embodiments of the invention, examples of which are illustrated in the accompanying drawings. Wherever possible, the same reference numbers will be used throughout the drawings to refer to the same or like parts.

Figure 1:
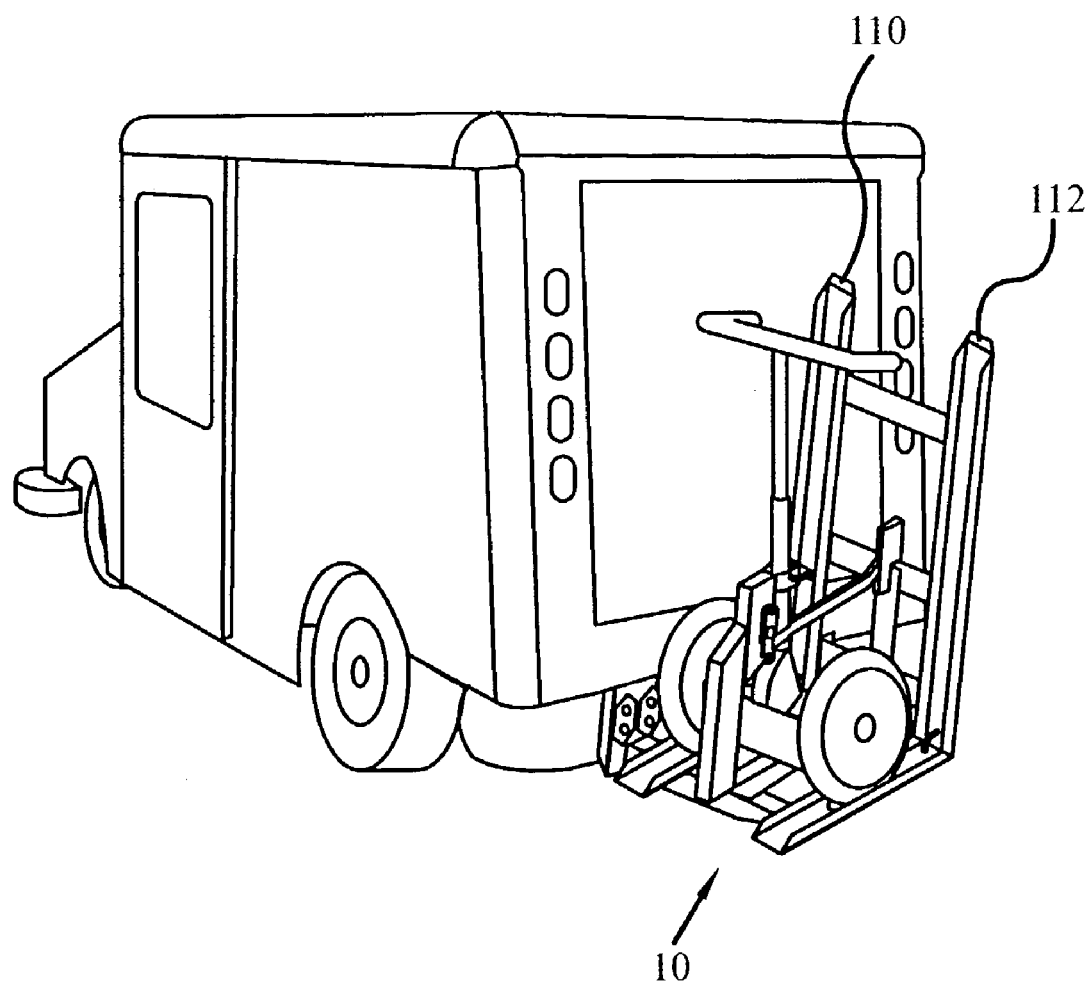
FIG. 1 is a perspective view of the human transporter storage rack attached to a postal vehicle and holding a human transporter in stored position.
Figure 2:
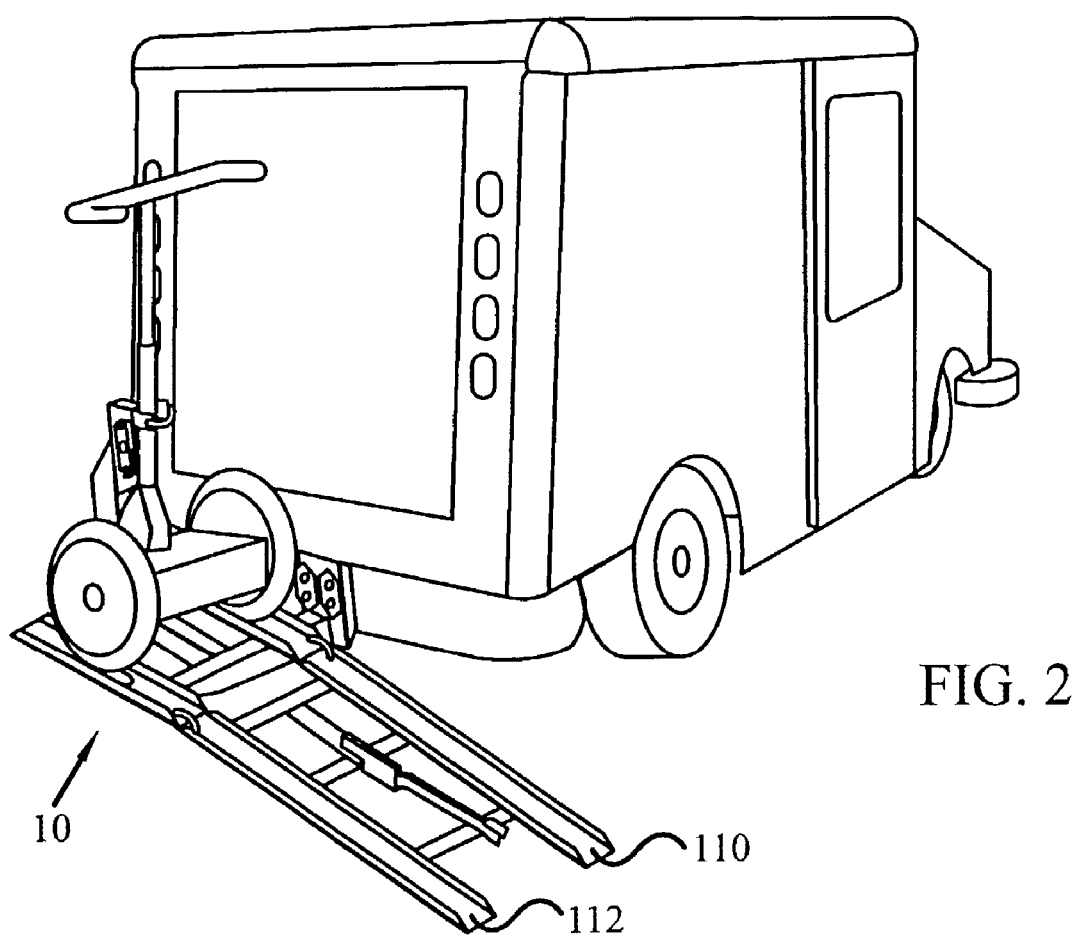
FIG. 2 is a perspective view of the human transporter storage rack showing the ramp module in unloading position.

While it is not part of the present invention, an understanding of the parts and layout of a SEGWAY-type human transporter, sometimes referred to herein as an HT, is useful for understanding the storage rack for such a device, as it is the storage rack that is the focus of the present invention. As seen in FIGS. 1 and 2 the HT rides on 2 wheels which are connected at a given distance. A control bar rises from a position in the center of the wheels. A set of handle bars are affixed to the upper end of the control bar. Optionally, the HT may include brackets which may be employed for carrying mail bags and/or mail satchels. A step is located between the wheels where a human operator may stand when operating the HT. More information related to the SEGWAY HT is available at www.segway.com.

Referring initially to FIGS. 1 and 2 will provide an introduction to an embodiment of the storage rack of the present invention. FIGS. 1 and 2 show two perspective views of storage rack 10 attached to a vehicle with an HT positioned on storage rack 10. FIG. 1 shows storage rack 10 in the closed or locked position (also referred to as the engaged position) where tracks 110, 112 are raised in a substantially vertical position. This is the position for transporting an HT as the HT is secured to storage rack 10 in this position. FIG. 2 shows storage rack 10 in the open or unloading position. Here tracks 110, 112 have been lowered such that in this instance they rest on the ground or some other unloading surface. In this open position the HT may be unloaded or removed from storage rack 10 for service by moving the HT down tracks 110, 112.

Figure 3:
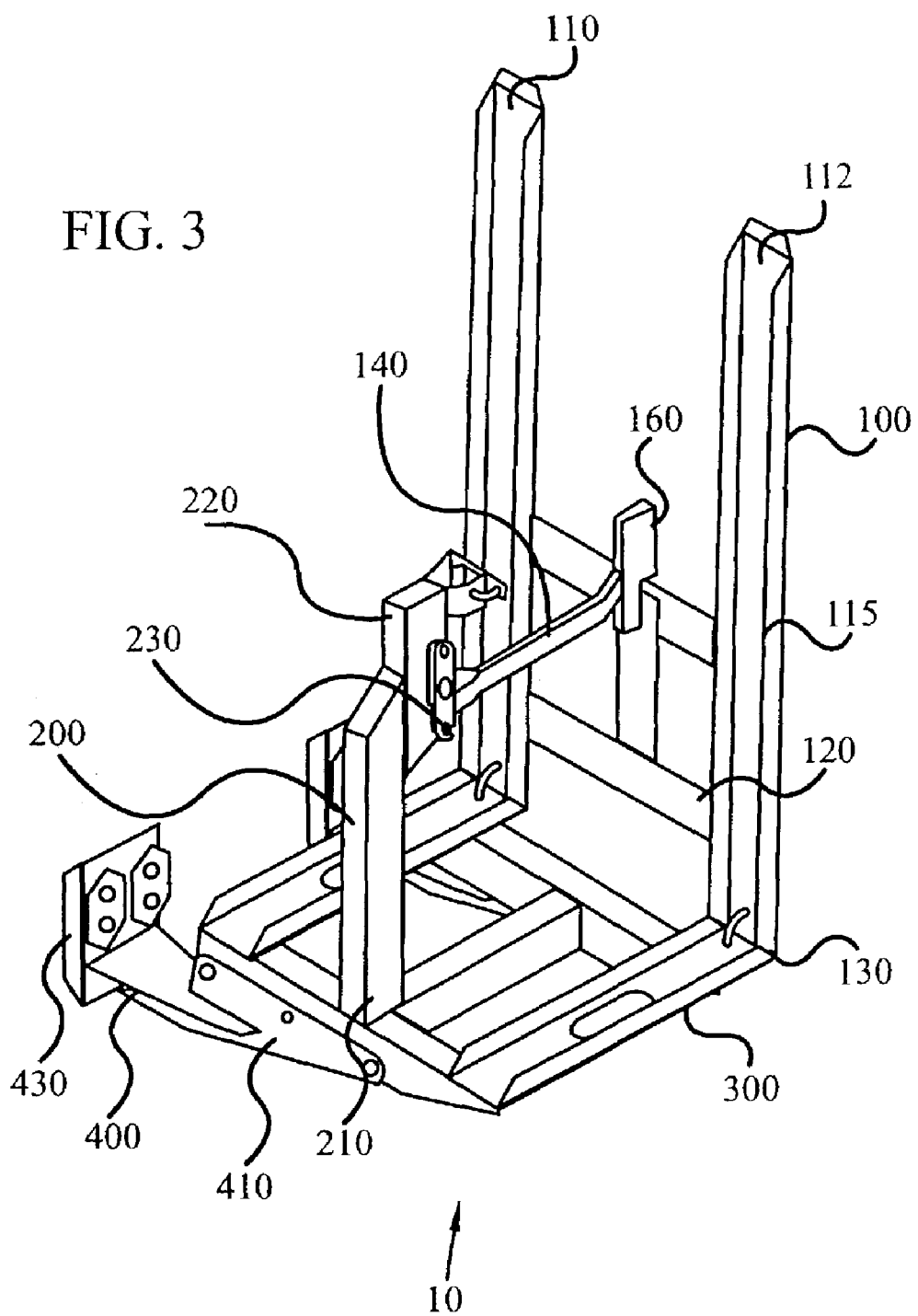
FIG. 3 is a perspective view of the human transporter storage rack.

Referring now to FIG. 3 there is shown a perspective view of storage rack 10. Generally a preferred embodiment of storage rack 10 comprises ramp module 100, vertical support column 200, platform module 300, and attachment means 400.

Still referring to FIG. 3, ramp module 100 consists generally of two parallel channels or tracks 110, 112. The tracks may take any configuration satisfactory to provide a support on which the wheels of the HT can travel. The wheels of the HT ride on a surface of tracks 110, 112. Preferably, tracks 110, 112 are positioned so that the distance between the center lines of each track 110, 112 approximates the distance between the wheels of the human transporter that is to be associated with storage rack 10. In a preferred embodiment, tracks 110, 112 comprise extruded aluminum channels. However, in an alternative embodiment the ramps may be constructed from a variety of strips. The width of an individual track 110, 112 is a width sufficient to provide support for the individual wheels of an HT. In a preferred embodiment individual tracks 110, 112 are between about 4 and about 6 inches in width. Preferably, individual tracks 110, 112 are further provided with lip 115 running along either length of track 110, 112. Lip 115 acts to keep an HT wheel from running off track 110, 112 when the HT is traveling along the tracks.

Ramp module 100 may be provided with cross members 120 to provide structural integrity to the ramp module. While said cross members are shown in the preferred embodiment, running substantially perpendicular between opposing tracks 110, 112, other configurations are possible. Cross members 120 may run at angles or diagonals between tracks. Preferably cross members 120 are attached to the underside of tracks 110, 112 so as not to impede travel of an HT on the upper surface of tracks 110, 112.

Ramp module 100 is secured to platform module at pivot point 130. Pivot 130 may comprise a hinge. In a preferred embodiment, pivot point 130 comprises hinges placed at the end of each track 110, 112. One edge of a hinge is secured to one end of a track 110, 112 and the other edge of a hinge is secured to platform module 300. Pivot 130 allows ramp module 100 to rotate at pivot point 130 while staying secured to platform module 300. Pivot point 130 may also take other embodiments that allow the rotating motion while staying attached such as a dowel, pin, hook, slot, or ball joint.

Still referring to FIG. 3, in one embodiment ramp module 100 also includes locking arm 140. Locking arm 140 is secured at one end to ramp module 100. Preferably, locking arm 140 is secured to ramp module 100 but is free to rotate at ramp module 100. Additionally, locking arm 140 is preferably secured to cross member 120. Preferably a pair of brace plates 160 serves to prevent locking arm 140 from having excessive lateral motion. Brace plates 160 are attached to cross-member 120 in a position that each brace plate is substantially parallel to the other. Brace plates 160 are spaced apart such that locking arm 140 may be positioned between brace plates 160. The space between brace plates 160 generally restricts locking arm 140 to a desired plane of movement.

At one end of the movement allowed to locking arm 140, a stop (not shown) on locking arm 140 rests against cross member 130 so as to prevent locking arm 140 from moving beyond a desired point. This is the point of movement that generally corresponds to the position of locking arm 140 when in the closed position. At the opposite end of the movement allowed to locking arm 140, locking arm's 140 movement when put in the unlocking position is stopped when locking arm 140 comes to rest against a cross member 120, as shown in FIG. 2.

Figure 5:
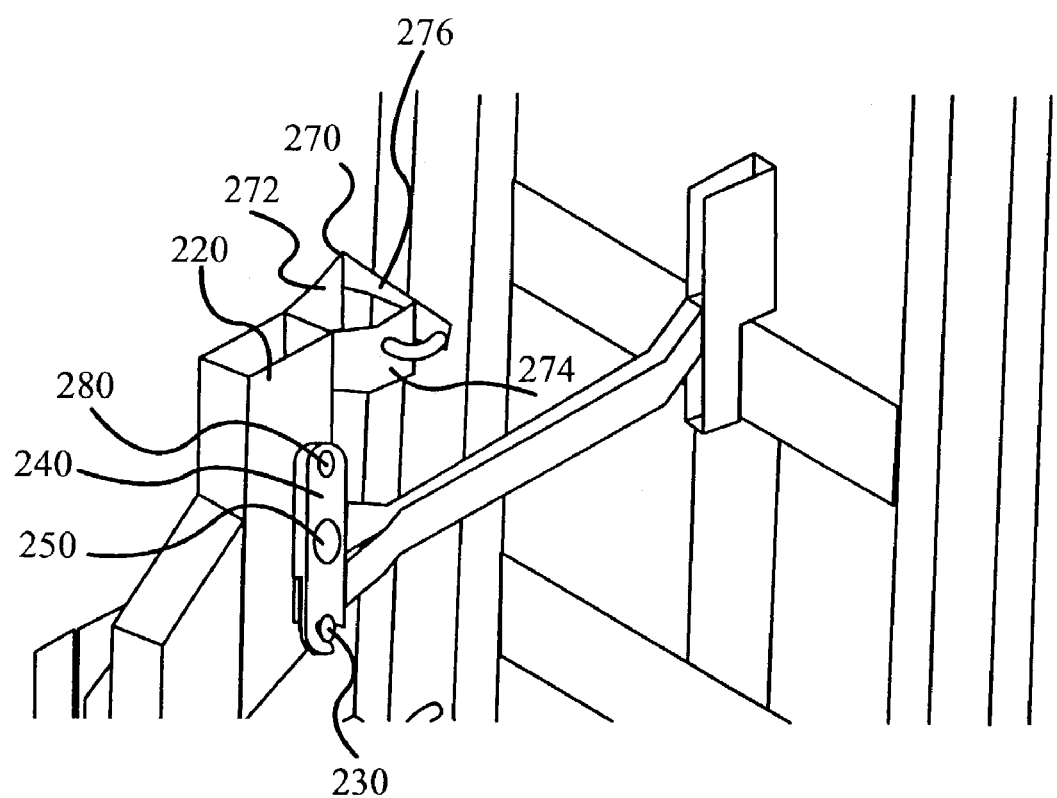
FIG. 5 is a close up perspective view of the human transporter storage rack showing the ramp module in stored position and the locking arm in engaged, closed, or locked position.
Figure 6:
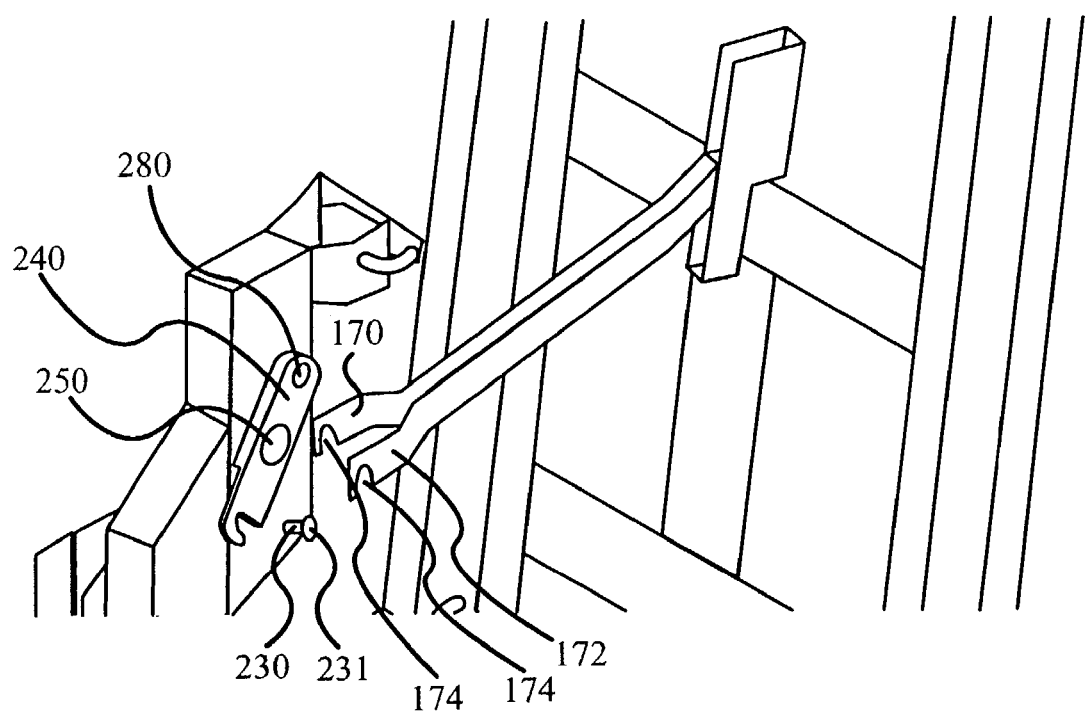
FIG. 6 is a close up perspective view of the human transporter storage rack showing the locking arm and locking bar in a disengaged or unlocked position.

Referring to FIG. 6 at the opposing end of locking arm 140, locking arm 140 forks into sections 170, 172. There are two forked sections. Each forked section 170, 172 contains a recess 174. In the closed and locked position, recess 174 of each forked section 170, 172 engages locking pin 230 on center support 210 as shown in FIG. 5. Further, when an HT is stored on storage rack 10, the space defined between forked sections 170, 172 surrounds the center pole of the HT. When ramp module 100 is placed in the open position, locking arm 140 rotates so that it is in a position substantially parallel to that of tracks 110, 112. By rotating into this position, locking arm 140 does not obstruct the movement of an HT along tracks 110, 112.

Figure 4:
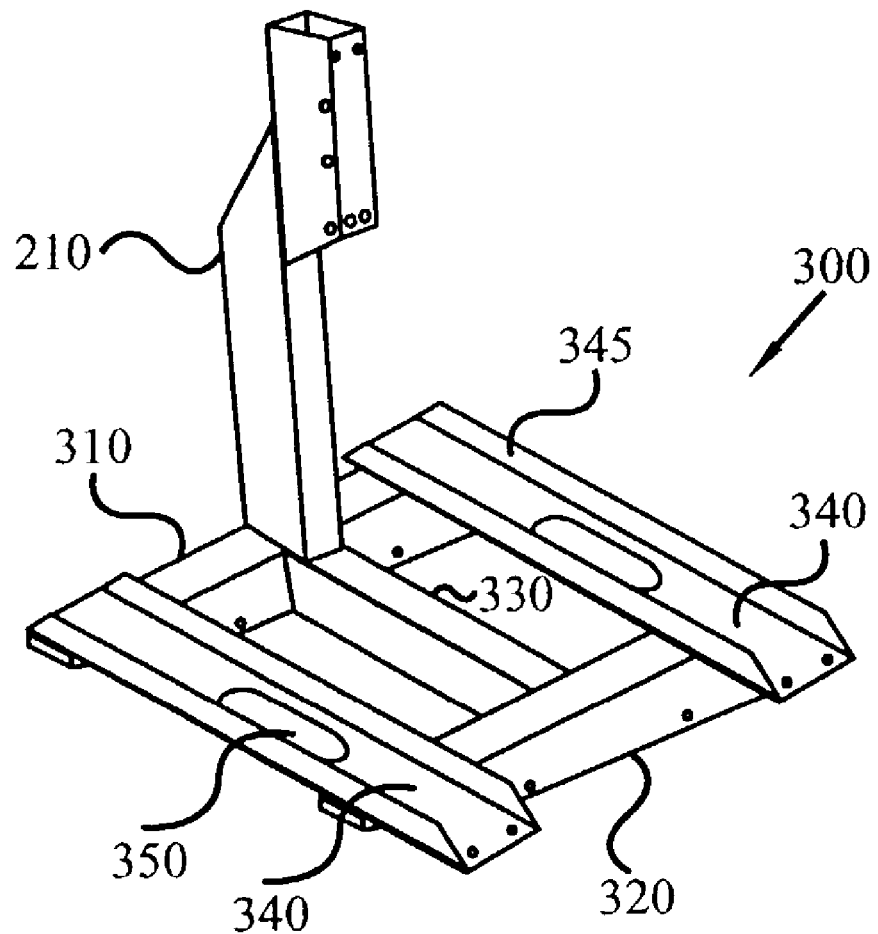
FIG. 4 is a perspective view showing the platform module and vertical support column module.

Platform module 300 is shown in FIG. 4. Platform module 300 comprises a framework 310 where an HT is lodged and secured. Preferably, framework 310 includes runner supports 320 and one or more beams 330. Alternatively, runners 340 may be an integral part of framework 310. Vertical support column 200 is attached to platform module 300. Ramp module 100 is also attached to platform module 300. In a preferred embodiment, platform framework 310 is in the shape of an "H" frame with runners 340 affixed to the opposing arms of the "H" frame.

As with ramp module 100, platform module 300 includes a pair of runners 340. Runners 340 are similar in cross-dimension to tracks 110, 112 used in ramp module 100 in that both sets of tracks and runners have a similar width. Additionally, in a preferred embodiment, runners 340 include lip 345 to keep the wheels of an HT on runners 340. It is desirable that runners 340 and ramp module tracks 110, 112 have similar width and be attached in a manner such that runners and tracks align substantially. In this way the HT will have free movement as it transitions from ramp module 100 and onto platform module 300 and vice versa.

Runners 340 include cutouts 350. Cutouts 350 are shaped to receive a portion of the wheel on a desired HT. When an HT is positioned on platform module 300 such that its wheels lodge in the space provided by cutouts 350, the HT is held by platform module 300. An HT is further held to storage rack 10 by locking arm 140 and vertical support column 210.

Vertical support column 200 shown in FIGS. 3 and 4 is a member extending in substantially orthogonal direction from the plane of platform module 300. At the upper end of vertical support column 200 is pin block 220. Locking pins 230 are located on either side of pin block 220. A preferred embodiment includes two such pins although an embodiment with one pin is possible. Locking pins 230 are generally cylindrical in shape. Preferably locking pins 230 include end cap 231 shown in FIG. 6. End cap 231 has a greater diameter than the cylindrical portion of the locking pin body. End cap 231 thus serves to hold forked sections 170, 172 from locking arm 140 in place on locking pins 230. Preferably, locking pins 230 extend outwardly from pin block, although they may be located within.

Referring now to FIGS. 5 and 6 generally, in a preferred embodiment, locking bars 240 are also located on either side of pin block 220. Preferably locking bars 240 are pivotally attached to pin block 220 so that locking bar 240 can move in a swinging motion. In a closed position, recesses in locking bars 240 engage locking pins 230. In this closed or engaged position locking bars 240 can be locked into position by plunger lock 250. Plunger lock 250 located on at least one locking bar 240 holds the locking bar securely to pin block 220. Preferably plunger lock 250 includes a plunger, dowel, or pin that moves inwardly into pin block 220 when in locked position. A receiving hole in pin block 220 receives the locking plunger, pin, or dowel thereby locking bar 240 to pin block 220 in a nonmoving position. Preferably only one locking bar 240 includes plunger lock 250; however if desired plunger locks can be configured on both locking bars 240.

Figure 7:
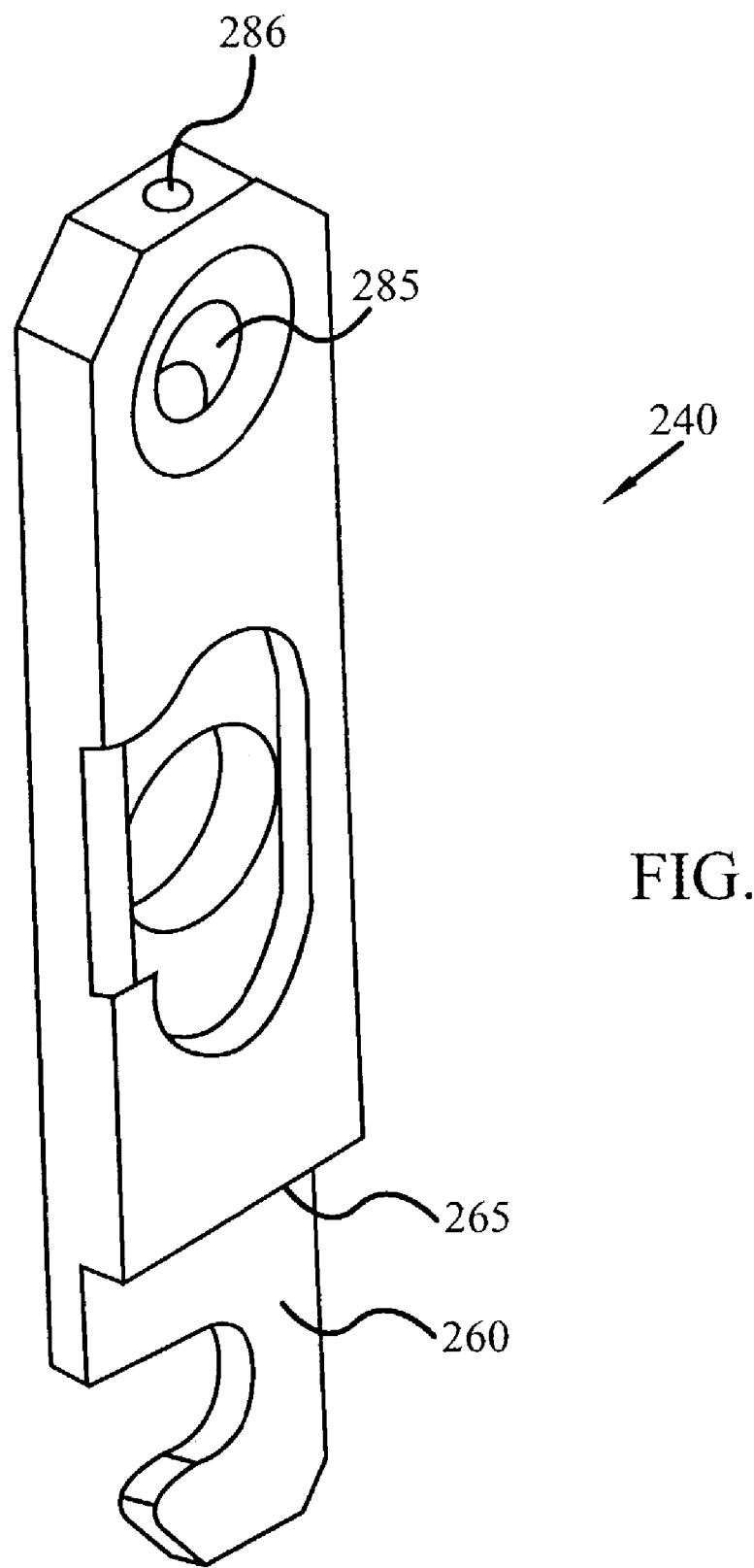
FIG. 7 is a close up perspective view showing the locking bar used on the vertical support column module.

Preferably a pair of locking bars 240 is made to swing in tandem. This is achieved in one embodiment by having rod 280 mounted on pin block 220 such that rod 280 is allowed to rotate in pin block. Locking bars 240 are attached to ends of rod 280. Locking bars 240 may be attached to rod 280 in a manner such that locking bars 240 will swing in tandem. This may be achieved by having locking bars 240 press fitted to rod 280. Alternatively, and preferably, locking bars 240 are attached to rod 280 by means of a dowel where the dowel links locking bars 240 to rod 280 thus ensuring that there is no slippage of locking bars 240 on rod 280 when locking bars swing. FIGS. 5 and 6 show an end portion of rod 280 where locking bar 240 is attached to rod 280. FIG. 7 shows aperture 285 formed on locking bar 240 for receiving rod 280. FIG. 7 also shows hole 286 on locking bar 240 for fitting the dowel that links locking bar 240 to rod 280.

Locking bar 240 is configured so as to hold locking arm 140 in place when locking bar 240 is in the locked position. Referring to FIG. 7 there is shown a view of locking bar 240 with a lap joint recess 260. Lap joint recess 260 defines a lap surface 265. Lap joint recess 260 is configured so that the corresponding area of forked sections 170, 172 fits within the area of defined by lap joint recess 260. When locking arm 140 is in the closed position and forked sections 170, 172 are resting on pins 230 at their recesses 174, locking bars 240 can also move into locking position and rest on pins 230. The space defined by lap joint recess 260 allows locking bar 240 to move over forked sections 170, 172. In this closed and locked position, lap surface 265 acts to secure forked sections 170, 172 in place. For example, an attempt to pull up on locking arm 140 would encounter resistance as forked sections 170, 172 are forced against lap surface 265. Further locking bars 240 are held in place against such a force because locking bars 240 are themselves engaged with pins 230.

Optionally, as shown in FIGS. 5 and 6, vertical support column 200 of storage rack 10 may include a control bar latch 270. Control bar latch 270 is designed to receive the control bar of an HT when the HT is placed on storage rack 10. Control bar latch 270 is preferably located on the upper end of pin block 220. As shown in FIGS. 5 and 6 control bar latch 270 includes arms 272, 274 and closure piece 276. Together arms 272, 274 and closure piece 276 define a space where the HT control bar would fall when the HT is in the stored position. Preferably arms 272, 274 and/or closure piece 276 may include an elasticized or rubberized material. Such a material provides a shock resistance that stabilizes the HT control bar when the vehicle is in motion. Closure piece 276 may be secured to one of arms 272, 274 thereby firmly enclosing an HT control bar. Optionally, control bar latch 270 may be locked when in the closed position.

Referring again to FIG. 3 there is shown attachment means 400. In a preferred embodiment, attachment means 400 comprises brackets 410, 420 and bumper plates 430, 440. Brackets 410, 420 attach to platform frame 300. Bumper plates 430, 440 attach to brackets 410, 420. The storage rack 10 is affixed to a vehicle when bumper plates 430, 440 are secured to an appropriate portion of a vehicle, such as the rear bumper of the vehicle. It will of course be understood that different vehicles have different configurations where storage rack 10 might attach to such a vehicle. Bumper plates 430, 440 in the preferred embodiment are substantially planar as this is the kind of mating surface to which it is attached on the intended USPS vehicle. Bumper plates 430, 440 may take an alternative shape such as curved or angular in order to properly mate with other kinds of surfaces. While the above configuration is appropriate for one intended vehicle, a carrier route vehicle of the U.S. Postal Service, it may not be appropriate for other kinds of vehicles. Nevertheless there are alternative methods of attaching structures such as a storage rack to the rear of a vehicle, including clamps, tensioners, and hitches. These alternative forms of attachment are also attachment means 400 in the present invention.

In a preferred embodiment ramp module 100 opens to the unloading position by swinging to the right hand side of the vehicle to which storage rack 10 is attached. In this manner the human transporter can be offloaded down tracks 110, 112 in a direction that is away from traffic, assuming that the vehicle is parked on the right hand side of a road. Alternatively, ramp module 100 may open in other directions including to the rear of the vehicle or to the left of the vehicle.

Storage rack 10 may be constructed of several suitable materials. Preferably, storage rack 10 is made substantially of extruded aluminum. Reasons for making this material selection include strength, ease of handling, corrosion properties, cost, and availability. Certain specific parts such as locking mechanisms are preferably fabricated from stainless steel. Attachment means 400 may also be constructed from steel for added strength. Storage rack 10 may be constructed of other materials that provide the needed strength to carry a human transporter. Acceptable materials include wood, plastics, metal, and metal alloys.

The individual pieces that assemble storage rack 10 may be joined by any of several methods. Preferred connectors include bolts, screws, rivets, pins, and welds. Other methods are know to persons skilled in the art and are included in the scope of the invention.

In operation an HT is loaded onto storage rack 10 in the following manner. Ramp module 100 is first opened into the unloading position. The act of opening ramp module 100 comprises disengaging ramp module 100 from the locked position, if so locked. The act of unlocking may necessitate unlocking plunger lock 250, pulling back locking bar 240 off pin 230 so as to allow forked sections 170, 172 to be lifted off pin 230. Ramp module 100 may then be moved at pivot 130 until lowered so that the unattached end of tracks 110, 112 rest on the ground or other desired object. The HT is positioned so that its wheels align with tracks 110, 112. The HT may be pushed, or driven under its own power, so as to ascend tracks 110, 112 until reaching platform module 300. The HT will pass from tracks 110, 112 to runners 340. The HT is further driven forward over runners 340, manually or self-powered, until each wheel of the HT falls into cutouts 350 provided in runners 340. Each pair of tracks 110, 112, runners 340, and cut outs 350 are spaced apart so as to match the spacing between the wheels of the desired model of HT. Thus, the wheels of the HT fit on the pairs of tracks 110, 112, runners 340, and cutouts 350.

Once the HT has been placed in cutouts 350, ramp module 100 may be raised to the upright position, also a closed, locked, or engaged position. This is done by pivoting ramp module 100 at pivot point 130 until raised to a closed position.

A preferred feature of locking bar 140, attached to ramp module 100, is the ease with which it can be made to engage locking pins 230. Locking bar 140 rotates where it is attached to ramp module 100; and consequently, as ramp module 100 is raised, locking bar 140 tends to fall. However, a stop (not shown) that is preferably an integral part of locking bar 140 prevents locking bar 140 from falling below a certain desired point. This stopping point is selected so that locking arm 140 falls by gravity and is then held in a position such that forked sections 170, 172 easily engage pins 230. Further, as ramp module 100 is gradually pulled upward and into the closed position, forked sections 170, 172 of locking bar 140 gradually move toward pin block 220. When forked sections 170, 172 approach pin block 220 they encounter locking bars 240. When hanging freely locking bars 240 are in a generally vertical position such that locking bar recesses are over pins 230. However, when forked sections 170, 172 move toward pin block 220 the tip of forked sections 170, 172 push on corresponding locking bars 240. The contact between forked sections 170, 172 and locking bars 240 occurs at a location on locking bar 240 above lap joint area 260. By this contact, locking bars 240 temporarily swing away from pins 230 and forked sections 170, 172 engage pins 230. Thereupon locking bars 240 swing back into normal, vertical position and locking bar recesses engage pins 230. Further lap surface 265 covers the corresponding portion of forked section 170, 172.

What has been described occurs as a continuous and fluid movement. Thus, for the ease of the human operator, ramp module 100 is raised, and, at the conclusion of the raising motion locking arm 140 is engaged. The movement of locking arm 140 further drives forked sections 170, 172 to a position that holds the control bar of the HT. Because locking arm 140 is engaged, ramp module 100 is held in place and cannot, for example, fall back to the ground unexpectedly. In effect the human operator's single action of raising ramp module 100 completes the engaging movement. To complete the desired locking and securing of the HT, the human operator now can engage plunger lock 250.

At various points in this specification, it has been stated that the HT is driven, moved, transported, or passed onto the storage rack or off the storage rack. In such an operation, it is strongly preferred that the human operator not ride the HT itself onto or off the storage rack. It is preferred instead that the human operator control the HT from another position, such as standing on the ground while adjacent to the HT with hands controlling the HT. This preference exists for safety reasons. However, any operation, regardless of the human operator's position on or off the HT (riding or not riding) is deemed within the meaning of the specification where it calls for a driving, moving, transporting, or passing of the HT onto or off the storage rack.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. One of ordinary skill in the art will recognize that the process just described may easily have steps added, taken away, or modified without departing from the principles of the present invention. Accordingly, the scope of protection is not limited to the embodiments described herein, but is only limited by the claims which follow, the scope of which shall include all equivalents of the subject matter of the claims.

What is claimed is:

1. A storage rack for transporting a human transporter comprising:
    a platform for receiving a human transporter;
    a ramp module hingeably attached to said platform and wherein the human transporter can move over said ramp module to said platform;
    a vertical support column attached to said platform; and
    means for securing said ramp module to said vertical support column comprising a locking bar hingeably attached to said ramp module at one end and having a forked section with a recessed area at the other end; a pin attached to said vertical support column for receiving said forked section at said recessed area of said forked section; and a locking bar rotatably attached to said vertical support column for locking said forked section against said pin.

2. A storage rack for carrying a two-wheeled self-balancing human transporter on a vehicle comprising:
    a pair of ramps held in substantially parallel position with the distance between the center lines of said ramps approximating the distance between the wheels of the human transporter, said pair of ramps allowing the human transporter to travel on a surface of said pair of ramps;
    a cross member positioned between said pair of ramps for holding said ramps in position;
    a framework attached to the vehicle;
    a pair of runners mounted on said framework, said pair of runners held in substantially parallel position with the distance between the center lines of said tracks approximating the distance between the wheels of the human transporter; each of said pair of runners attached to each of said pair of ramps by a hinge thereby allowing said pair of ramps to move from an unloading position to a closed position, said pair of runners allowing the human transporter to travel on a surface of said pair of runners;
    a vertical support column affixed to said framework in a substantially orthogonal direction;
    a locking bar with two ends, rotatably attached to said cross member at one end thereby permitting said locking bar to swing freely; and
    means for securing said locking bar to said vertical support column.

3. The storage rack of claim 2 further comprising a pair of brace plates affixed to said cross member wherein said locking arm is positioned between said brace plates and whereby said brace plates substantially limit the ravel of said locking arm to a given plane.

4. The storage rack of claim 2 wherein said locking arm further comprises a locking arm stop whereby the travel of said locking arm is limited by the contact of said locking arm stop with said cross member.

5. The storage rack of claim 2 wherein said means for securing together comprises securing a human transporter to said storage rack.

6. The storage rack of claim 2 wherein said pair of ramps opens in the direction toward the right hand side of the vehicle to which said storage rack is affixed.

7. A carrier rack for rigid attachment to a carrier land vehicle for transporting a dual-wheeled land vehicle, the carrier rack comprising:
    first and second dual track assemblies and a support for receiving the rigid attachment to the carrier land vehicle, wherein:
    the first dual track assembly:
        is upon and supported by the support has a vertical support column attached thereto; and
    the second dual tack assembly:
        is attached to the first dual track assembly for rotatably receiving respective wheels of the dual-wheeled land vehicle from the first dual track assembly; and
        has an open and closed position thereof, said open position providing for rotatable ingress and egress of the wheels of the dual-wheeled land vehicle respectively on and off the support;
    a locking arm comprising a plurality of forked sections, between the receptive tracks of the first dual track assembly, for restraining:
        the second dual track assembly in the closed position thereof; and
        the movement of the dual wheeled land vehicle relative to the carrier land vehicle.

8. The carrier rack of claim 7, wherein the vertical support column further comprises a latch for securing a vertical portion of the dual wheeled land vehicle, the latch including at least two arms and a closure piece.

9. The carrier rack of claim 7, where the dual-wheeled land vehicle is a self-balancing personal transportation device.

10. The carrier rack of claim 7, wherein the dual-wheeled land vehicle is a self-balancing electric one axle, stand-up scooter.

11. The carrier rack of claim 7, wherein the first and second dual track assemblies are substantially perpendicular to the direction of travel of the carrier land vehicle.

* * * * *